UNITED STATES PATENT OFFICE.

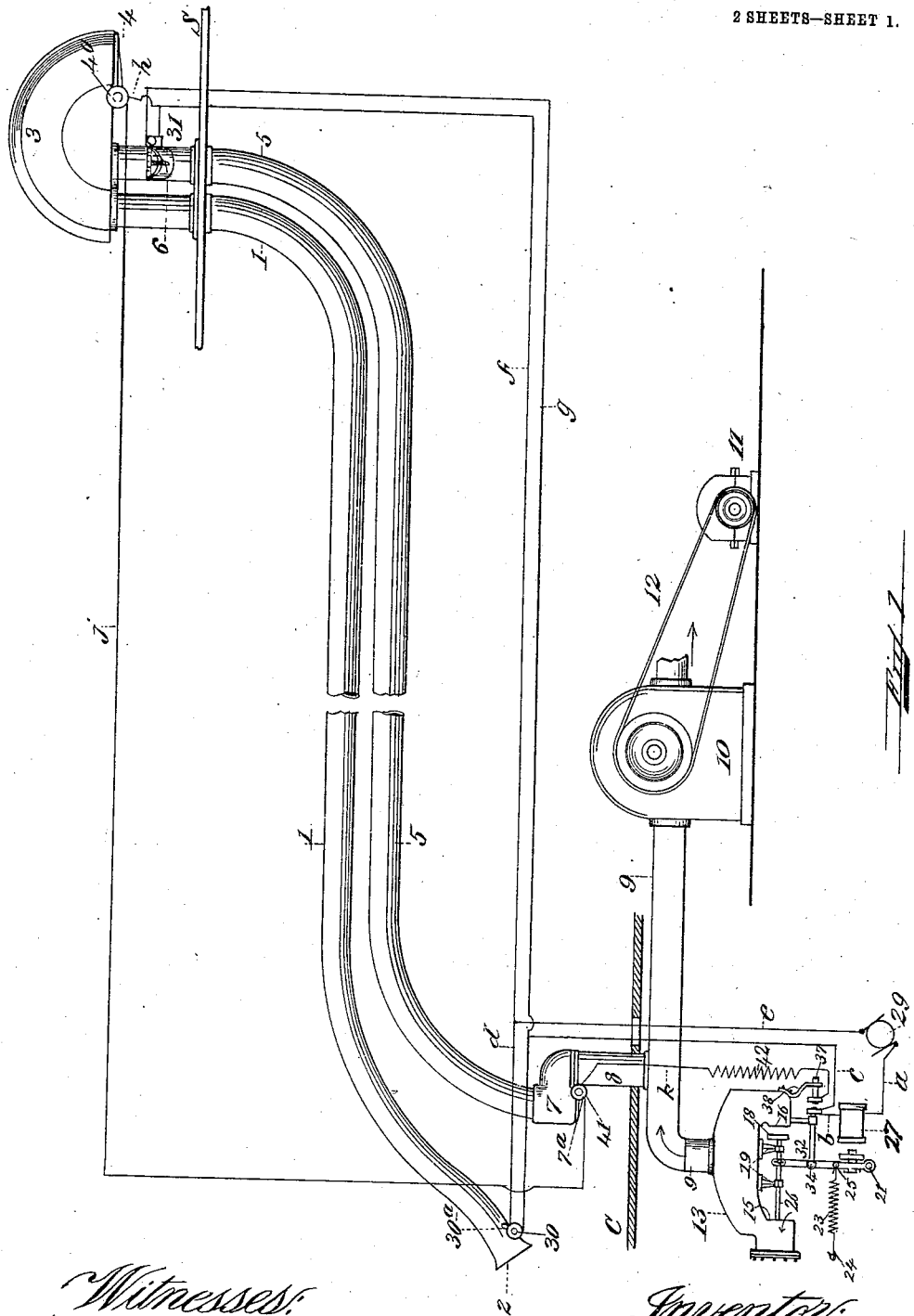

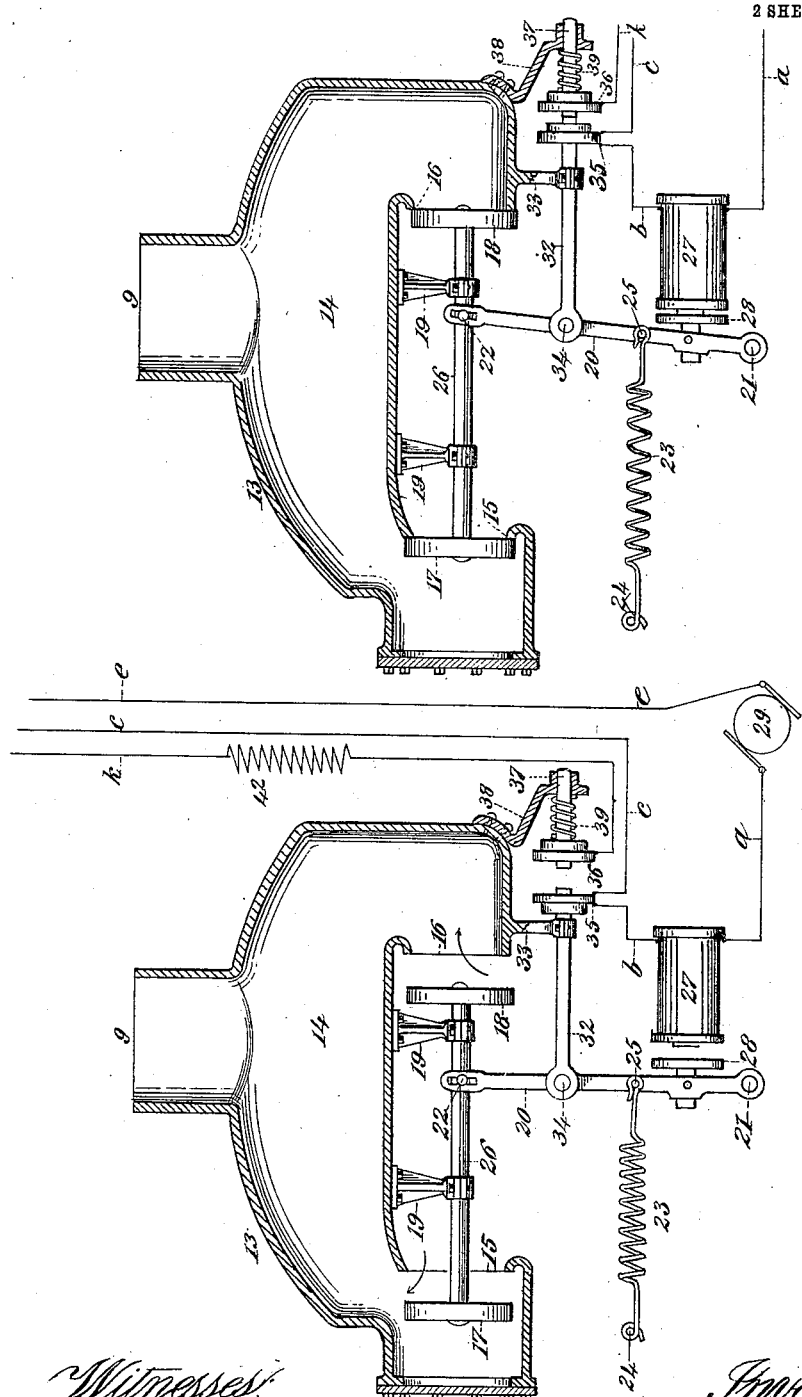

JAMES G. MACLAREN, OF WEEHAWKEN, NEW JERSEY, ASSIGNOR TO LAMSON CONSOLIDATED STORE SERVICE COMPANY, OF NEWARK, NEW JERSEY, A CORPORATION OF NEW JERSEY.

PNEUMATIC-DESPATCH-TUBE APPARATUS.

968,580.   Specification of Letters Patent.   Patented Aug. 30, 1910.

Application filed April 16, 1908. Serial No. 427,356.

*To all whom it may concern:*

Be it known that I, JAMES G. MACLAREN, of Weehawken, in the county of Hudson and State of New Jersey, have invented certain new and useful Improvements in Pneumatic-Despatch-Tube Apparatus, of which the following is a specification.

My invention relates to improvements in pneumatic despatch tube apparatus and its object is to provide means whereby the flow of air to a blower or pump connected with the transmission tubes is normally short circuited when there are no carriers in transit through said tube thereby relieving the load upon the blower or pump and consequently effecting the saving of power. A balance valve is provided which is adapted to be electrically controlled to govern the short circuiting of the air and adapted when a carrier is to be despatched in the system to switch the flow of air through the transmission tubes for driving the carrier. This valve is operated by a magnet to switch the flow of air and while in operating position means are provided for reducing the current through the magnet until the carrier has delivered at its destination.

In the accompanying drawings which illustrate a construction embodying my invention Figure 1 is a diagrammatic view of a pneumatic despatch tube system showing the parts in normal position and the electric connections controlling the same. Fig. 2 is an enlarged sectional elevation of the controlling mechanism showing the parts in normal position. Fig. 3 is a similar view to Fig. 2 showing the parts in operating position for switching the flow of air through the transmission tubes and loading the blower.

Like letters of reference refer to like parts throughout the several views.

C represents the cashier's or central station connected with the ordinary delivery terminal 3 controlled by the usual valve 4 at the substation S by means of a transmission tube I. The terminal 3 is connected with a terminal 7 at the central station by a return transmission tube 5 having the usual despatching inlet 6 for inserting carriers into said tube. 2 represents a bell mouth for inserting carriers into the tube 1 for despatch and for admitting air to the system for driving carriers.

9 is a conduit or air tube connected with a low pressure side of a blower 10 at one end and at the opposite end with a casing 13; the terminal 7 is connected with the conduit 9 by a tube 8; 11 is an electric motor adapted to drive the blower 10 by belt 12. The chamber 14 in the casing 13 is adapted to communicate with the atmosphere through ports 15 and 16 controlled by the valves 17 and 18 respectively; these valves are substantially balanced against the pressure in chamber 14 and are mounted on the rod 26 slidable in the hangers 19 secured to the casing 13.

20 is a lever fixed pivotally at 21, its upper end being slotted and adapted to operate rod 26 and valves 17 and 18 through a pin 22 connected with said rod. 23 is a spring secured at one end at 24 and at the other end at 25 to the lever 20; this spring 23 is adapted to normally operate through the lever 20, pin 22 and rod 26 to hold the valves 17 and 18 normally open (see Fig. 2) to admit air through ports 15 and 16, chamber 14 and conduit 9 to the bore as indicated by arrows.

27 is a magnet and 28 is an armature for said magnet secured to the lever 20.

29 is a motor generator in circuit with magnet 27 and switches 30 and 31 located at the central station C and substation S respectively and adapted to supply current to the said magnet to operate and close valves 17 and 18 through lever 20 by means of armature 28.

32 represents an insulating rod movable in the hanger 33 and pivoted at one end at 34 to lever 20; 35 is a contact piece secured to the opposite end of rod 32 and 36 is a similar contact piece mounted on insulator 37 movable in the hanger 38 and 39 is a spring mounted on the insulator 37 and adapted to maintain a slight tension on contact 36; these contacts 35 and 36 form a normally open switch which is adapted to be closed when the magnet 27 is energized.

The switches 30 and 31 are normally open and adapted to be closed when a carrier is despatched from either the central station C or the substation S.

The circuit through switch 30 and magnet 27 is as follows: from the generator 29 through wire *a*, magnet 27, wire *b*, contact 35, wire *c*, thence through switch 30 and wires d and e back to the generator 29. The switch 31 is connected in multiple through wires f and g.

40 is a circuit breaker connected with and adapted to be operated by the delivery valve 4 at the substation S. 41 is a similar circuit breaker connected with and adapted to be operated by the delivery valve 7ᵃ at central station C. These circuit breakers 40 and 41 together with a resistance 42 are included in a shunt circuit represented by wires h connected with wire f and wires j and k connected with the contact piece 36.

The operation of the device is as follows: To despatch a carrier from the central station C to the substation S, the operator inserts the carrier into the bell mouth 2 where it engages a trip 30ᵃ closing the switch 30 completing the circuit through and energizing the magnet 27 attracting the armature 28 and through lever 20 and rod 26 closing the valves 17 and 18 as shown in Fig. 3 cutting off the flow of air through the casing 14 and switching the same through the bell mouth 2 transit tubes 1 and 5, tube 8 and conduit 9 to the blower 10. The air now entering the bell mouth 2 drives the carrier through tube 1 toward the substation S. Simultaneous with the closing of valves 17 and 18 the lever 20 operates through insulating rod 32 to move the contact 35 against contact 36 completing a shunt circuit as follows: from generator 29 through wire a, magnet 27, wire b, contact 35 and contact 36 through wire k and resistance 42, circuit breaker 41, wire j, circuit breaker 40 and wires h, f, and e back to the generator 29.

After the carrier has passed the trip 30ᵃ, the circuit through switch 30 is broken and the magnet 27 is maintained energized through the shunt circuit described, the resistance 42 regulating and furnishing sufficient current only to the magnet 27 to retain armature 28. When the carrier delivers through valve 4 at the substation S, the circuit breaker 40 operates to break the shunt circuit, deënergizing the magnet 27 and releasing the armature 28. The tension of spring 23 now operates through lever 20 and rod 26 to open valves 17 and 18 and admit air through ports 15 and 16 and chamber 14 to conduit 9 (see Fig. 2) thereby short circuiting the flow of air and relieving the load upon the blower 10.

If a carrier is to be despatched the substation S to the central station, the operator opens the inlet 6 and inserts a carrier into tube 5. The circuit through switch 31 and magnet 27 is closed by the opening of the inlet 6 and the magnet 27 is energized attracting armature 28 and closing valves 17 and 18 as heretofore described cutting off the flow of air through chamber 14 and switching the same through the bell mouth 2, transit tubes 1 and 5 and tube 8, at the same time the circuit is closed through contacts 35 and 36 and circuit breakers 40 and 41. The inlet 6 is now closed and the carrier is driven through tube 5 toward station C, at the same time the switch 31 is opened and the magnet 27 is maintained energized through the shunt circuit. When the carrier delivers through the valve 7ᵃ at central station C the circuit breaker 41 is operated breaking the circuit through and deënergizing magnet 27, releasing armature 28 and opening valves 17 and 18 relieving the load on blower 10.

Having thus described a construction embodying my invention and set forth a construction embodying the same, what I claim as new and desire to secure by Letters Patent of the United States is:

1. In a pneumatic despatch tube apparatus, a tube for the transmission of carriers, a blower or pump, a connection between said tube and said blower or pump whereby air is exhausted from said tube and provided with an air inlet, a normally-open valve controlling the admission of air through said inlet, means acting on said valve to maintain said air-inlet open, electro-magnetic means arranged to be operated upon entering the carrier into the transmission tube to actuate the valve to close the air-inlet thereby causing a flow of air through the transmission tube to drive said carrier, and means adapted to be operated by said carrier to open said valve and admit air through said inlet.

2. In a pneumatic despatch tube apparatus, a tube for the transmission of carriers, a blower or pump, a connection between said tube and said blower or pump whereby air is exhausted from said tube and provided with an air-inlet, a normally open valve controlling the admission of air through said inlet, means acting on said valve to maintain said air-inlet open, electro-magnetic means arranged to be operated upon entering the carrier into the transmission tube to actuate the valve to close the air-inlet thereby causing a flow of air through the transmission tube to drive said carrier, and means operated by said carrier for deënergizing said electro-magnetic means and opening said valve to admit air through said inlet.

3. In a pneumatic despatch tube apparatus, a tube for the transmission of carriers, a blower or pump, a connection between said tube and said blower or pump whereby air is exhausted from said tube and provided with an air-inlet, a normally-open valve controlling the admission of air through said inlet, means acting on said valve to maintain said air-inlet open, electro-magnetic means including a circuit and arranged to be operated upon entering the carrier into the transmission tube to actuate the valve to close the air-inlet thereby causing a flow of air through the transmission tube to drive said carrier, a shunt circuit, means for switching the circuit through said shunt to maintain said magnet energized, and means for breaking said shunt circuit and deënergizing said magnet upon the delivery of the carrier to open said valve and admit air through said inlet.

In testimony whereof, I have signed my name to this specification in the presence of two subscribing witnesses, this tenth day of April A. D. 1908.

JAMES G. MACLAREN.

Witnesses:
ELSIE MACLAREN,
WM. HEPPERLE.